Figure 1:
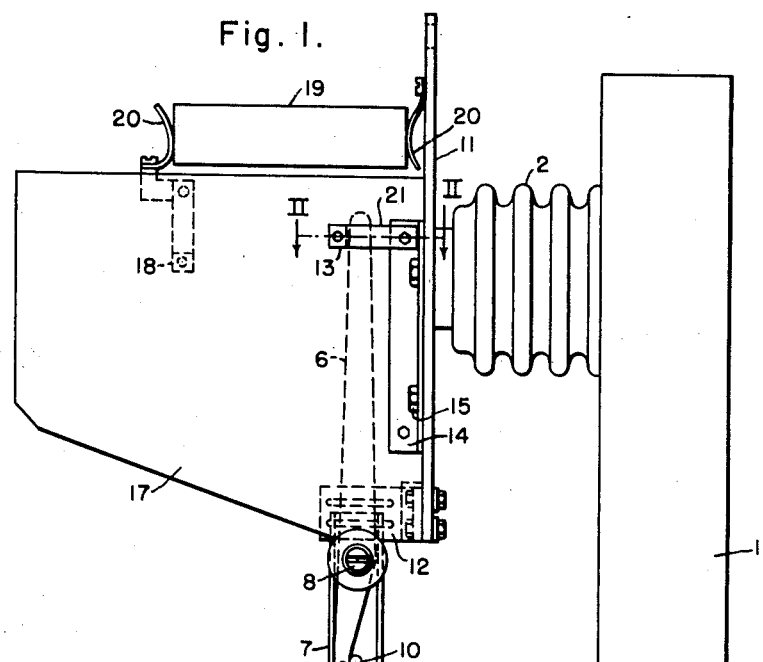

June 24, 1958

F. GIEFFERS 2,840,671

CIRCUIT INTERRUPTER

Filed Aug. 18, 1955

WITNESSES
Robert C. Baird
W. R. Crout

INVENTOR
Friedrich Gieffers.
BY
Ralph H. Swingle
ATTORNEY

2,840,671

CIRCUIT INTERRUPTER

Friedrich Gieffers, Berlin-Siemensstadt, Germany, assignor to Siemens-Schuckertwerke Aktiengesellschaft, Erlangen, Germany, a corporation of Germany Application August 18, 1955, Serial No. 529,300

Claims priority, application Germany August 30, 1954

13 Claims. (Cl. 200—146)

This invention relates to circuit interrupters, in general, and more particularly to disconnecting switches of the load-break type.

The switching-off of capacitor banks with the conventional load-break switch, without any special devices, was not possible because of the high over-currents and the high rate of rise of current, corresponding to the rate of rise of the short-circuit current depending on the network position, and the relative part of the wave at which the circuit is closed. Because of the high over-currents and the rate of rise of current, the capacitors, the circuit breakers and the network are subjected to severe stresses. Said strained conditions will occur at each closing of the circuit breakers; when same are opened, said conditions will occur only in case of restriking (the present switching devices are very susceptible to such restriking). These stresses in capacitors and switches will be particularly excessive in case the capacitor bank is switched on or off in a network having other capacitor banks connected in parallel. The magnitude and rate of rise of the over-current, in case the banks are connected in parallel, is practically limited only by the short connections between the banks.

Load-break switches for switching off capacitor banks, which would withstand the stresses imposed by the above mentioned currents, were known in the art, but the strains on the capacitor banks and the network were not eliminated. It was also suggested to provide additional inductances between the capacitor banks and the network, and between the banks themselves, to reduce the stresses imposed on the capacitors and network. It is also known in the art to use resistances which are inserted during switching operations and which can be inserted by a separate switch, or which in the case of oil or air-blast circuit breakers are built into the circuit breakers themselves, so that the separate switch becomes unnecessary. The above said measures for preventing high stresses of the load-break switches, of the capacitor banks and of the network have the big disadvantage of being very expensive and require in most cases substantial additional space.

The present invention relates to switches wherein with simple means, the stresses to the network, switches and capacitor banks, which can occur when the capacitor banks are connected or disconnected from the network, or are connected in parallel, are substantially reduced so that any damage to the switch, the capacitor bank and to the network are safely eliminated. For this purpose a so-called load-break disconnecting switch is used. Said load-break disconnecting switch is designed from a conventional load-break switch in that the switching blade is operated between two parallel plates. Said plates are made of a material capable of evolving gases for arc-extinguishing purposes. But these known load-break switches of previous designs are not suitable for switching operations of capacitor-banks.

Switches made according to the construction of the present invention can be also used for switching off capacitor banks without straining the switches, the network and the capacitor banks. This is obtained by an additional contact in the path of the switching blade, said contact being connected to the main contact through a protective resistance.

Said protective resistance is preferably made of a resistance material comprising a mixture of carbon black, talc and a resin, such as a phenol-aldehyde resin, as binding means. Under temperature and pressure said materials are pressed together to a solid body. The use of said material is particularly advantageous, since its specific heat is very high, so that the volume of the resistance can be easily chosen, so that even in case of switching in against a short-circuit, the protective resistance will not be damaged by the heat released in it. The flash-over strength of such a resistance is very high so that flash-overs at very high voltages (when capacitor banks are connected to or disconnected from the network) are prevented. These flashovers must be prevented in all cases to prevent damage to the switches, the capacitor banks and the network.

The protective resistances are dimensioned to have, when the resistance is switched-in, an initial current surge not higher than 5 to 10 times the normal current, i. e., that the resistance amounts to 10 to 20% of the capacitive impedance. It is particularly advantageous to have the initial current surge through the protective resistance equal to the current surge when the main contacts close.

Figure 2:
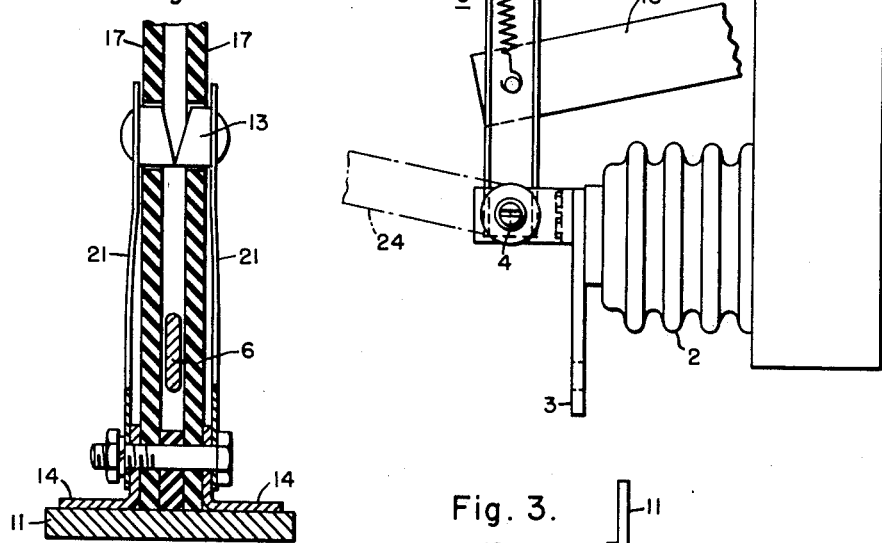
Figure 3:
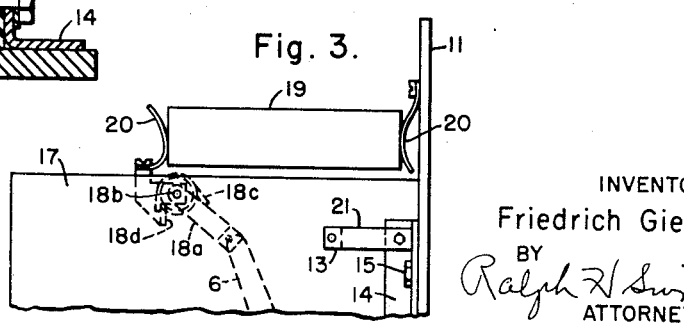

The present invention, as shown in the accompanying drawing, shall now be described. Fig. 1 shows a side view of a load-break disconnecting switch with a protective resistance. Fig. 2 shows the secondary stationary contact for the pivoted end of the switching blade, and Fig. 3 illustrates a modified type of auxiliary contact.

Fig. 1 shows two insulators 2 supporting the switch and fastened to the mounting plate 1. The line terminal 3 and the bearing 4 for the switch blade 5, comprising the upper part 6 and the lower part 7, are mounted on the lower insulator 2. The end 6 of the switch blade 5 is movably connected by pivot 8 with the main part 7 of the switching blade. A spring 9 is provided to return the pivoted end 6 of switching blade to its extended position. Pin 10 serves as a stop for pivoted end 6 of the switching blade so that this end portion can be rotated only in one direction. The upper insulator 2 supports the line terminal 11. The main stationary contact 12 which engages the main moving blade 7 of the switch and the secondary stationary contact 13 which engages the pivoted moving contact 6 of the switching blade are fastened by means of angular pieces 14 and screws 15 to the upper insulator 2. The switching blade 5 is operated by the operating rod 16. The two parallel plates 17 for arc-extinguishing are made of gas-evolving material. The pivoted part 6 of the switching blade moves between the above-mentioned plates. In accordance with the present invention an auxiliary contact 18 with the protective resistance 19 is provided in the path of the pivoted part 6 of the switching blade. The contact 18 is conductively connected by the contact springs 20 over the resistance 19 to the main-contact 12.

The position of the switching blade 5 when the load-break switch is open is indicated by the dotted lines 24.

Fig. 2 shows a particularly advantageous design of the stationary secondary contact which is engaged by the pivoted end 6 of the switching blade. The stationary secondary contact 13 comprises two parts having downwardly tapered inner surfaces and are resiliently mounted on the springs 21 in order to provide a latch to hold the pivoted end 6 of the switching blade after the load-break switch is closed, so that a correct sequence of the switching-contact-operation is assured when the load-break switch is opened.

The operation of the load-break switch is as follows: When the switch is moved toward closed position, the upper part 6 of the switching blade 5 engages the auxiliary contact 18 which also is preferably designed as a snap-contact (that is having tapered inner latch surfaces similar to contact 13), and thus connects the capacitor bank through the resistance 19 to the voltage source. The magnitude of the current surge depends upon the resistance.

The switching operation continues and the pin 10, provided as a stop for part 6 of the switching blade, prevents the snap-contact 18 from stopping the movement of the switching blade 5, which enters between the tapered contact surfaces of contact 18. After the switching blade 5 has left the contact 18, the circuit through the resistance is maintained by the arc until a direct connection with the network is made by the main contact 12. It is also possible to design the auxiliary contact 18 in such a manner that the part 6 of the switching blade will remain in contact with 18 until the main contacts close. This modification is shown in Fig. 3, where modified contact 18a is pivotally mounted on pin 18b and biased by coil spring 18c toward a stop 18d.

In the moment the blade 7 touches the main contact, a further current surge occurs. The current magnitude of this surge again depends upon the value of the protective resistance 19, since the difference between the capacitor voltage and the network voltage depends upon the value of said protective resistance. After the main contact is closed, the switching blade is latched behind the resiliently mounted contacts 13 so that when the load-break switch is opened the proper sequence of the contact operation is secured.

When the switch is opened, first the main contact is opened; i. e., the lower part 7 of the switching blade 5 leaves its stationary contact 12, but part 6 of the switching blade pivots at hinge 8 since its end is retained by the contact 13. The end of pivoted part 6 of the switching blade moves out around the contact 13 and is separated therefrom only after the distance between main part 7 of the blade and the main contact 12 becomes sufficiently large so that a restrike across this path is impossible. After the secondary contact 13 is disengaged from the part 6 of the switching blade thereby producing an arc, the switching blade 5 is returned to its extended position by the action of the snap spring 9. The switching blade 5 thus travels with a snap action over the path between the stationary secondary contact 13 and the auxiliary contact 18, and the moment the blade 5 touches the contact 18, the resistance 19 is connected in parallel to the above-mentioned arc. The arc will be extinguished since the voltage drop of the resistance is relatively small. If the arc should be extinguished before the blade engaged the contact 18, a new establishment of the arc with the resistance in series takes place, the magnitude of the current not being large because of the resistance. The arc, produced by the switching blade 5 when leaving the auxiliary contact 18, is in the circuit through the protective resistance and the capacitor bank and is extingushed by the further opening of the switching blade. The part 6, of course, will again pivot at hinge 8 until it passes around the latching contacts 18 or 18a, when it will again snap to its extended position and therefore provide a quick, snap break with consequent rapid arc extinction between the gas-evolving plates 17.

Although I have shown and described specific structures, it is to be clearly understood that the same were merely for the purpose of illustration, and that changes and modifications may readily be made therein by those skilled in the art, without departing from the spirit and scope of the invention.

I claim as my invention:

1. A load-break disconnecting switch for switching capacitor banks including a movable switch blade, a relatively stationary main contact cooperable with the movable switch blade, an auxiliary contact located in the path of movement of the switch blade, an impedance connected between the auxiliary contact and the relatively stationary main contact, and the impedance having a value of 10% to 20% of the capacitive impedance being switched.

2. A load-break disconnecting switch including a movable switch blade, a relatively stationary main contact cooperable with the movable switch blade, an auxiliary contact located in the path of movement of the switch blade, an impedance connected between the auxiliary contact and the relatively stationary main contact, and the impedance having such a value that the current impulse on closing of the auxiliary contact is substantially equal to the current impulse on closing the main relatively stationary contact.

3. A load-break disconnecting switch including a movable switch blade, a relatively stationary main contact cooperable with the movable switch blade, an auxiliary contact located in the path of movement of the switch blade, and a protective resistance including a mixture of carbon-black, talc and a resin as a binding means, which ingredients are pressed into a solid body under pressure and temperature reaction, said protective resistance being connected between the auxiliary contact and the relatively stationary main contact.

4. A disconnecting switch including a two-part movable switch blade, means pivotally mounting one part adjacent one end thereof, means pivotally mounting the other part adjacent the free swinging end of said one part so that the outer free end of said other part extends considerably beyond said one part, means operatively connected to said switch blade for effecting the opening and closing rotative movements thereof for maintaining a circuit open and closed for appreciable lengths of time, means biasing the two parts of the switch blade to an extended position, and means causing said other part to rotate only in one direction relative to said one part when the switch blade is in its extended position.

5. A disconnecting switch including a rotatable two-part movable switch blade, means pivotally mounting one part adjacent one end thereof, means pivotally mounting the other part adjacent the free swinging end of said one part so that the outer free end of said other part extends considerably beyond said one part, a relatively stationary main contact for cooperation with the free end of said one part, a relatively stationary secondary latching contact for cooperation with said other part, and means biasing the two-part movable switch blade to an extended position.

6. A disconnecting switch including a rotatable two-part movable switch blade, means pivotally mounting one part of said two-part rotatable switch blade at one end thereof about a substantially stationary pivot axis with the other extremity of said one part swinging freely, the other part of said switch blade being pivotally mounted adjacent the free extremity of said one part, a relatively stationary maincontact for cooperation with said one part, a relatively stationary secondary latching contact for cooperation with said other part, means biasing the two-part movable switch blade to an extended position, an auxiliary contact disposed adjacent the path of movement of said other part, and impedance means connected between said auxiliary contact and the relatively stationary main contact.

7. A disconnecting switch including a rotatable two-part movable switch blade, means pivotally mounting one part of said two-part rotatable switch blade at one end thereof about a substantially stationary pivot axis with the other extremity of said one part swinging freely, the other part of said switch blade being pivotally mounted adjacent the free extremity of said one part, a relatively stationary main contact for cooperation with said one part, a relatively stationary secondary latching contact for cooperation with said other part, means biasing the two-part movable switch blade to an extended position, an auxiliary latching contact disposed adjacent the path of movement of said other part, and impedance means connected between said auxiliary contact and the relatively stationary main contact.

8. The combination in a load-break disconnecting switch of a rotatable two-part switch blade, one part being rotatable about a relatively fixed axis and the other part being pivotally mounted adjacent the extremity of said one part, means biasing the two parts to an extended position, a relatively stationary main contact engageable with the extremity of said one part, a relatively stationary secondary latching contact for latching said other part of the switch blade during the opening operation to cause breaking of the two-part switch blade, an impedance, an auxiliary contact positioned adjacent the path of movement of said other part of the switch blade during its opening movement, said impedance means being connected between said auxiliary contact and the relatively stationary main contact, and the auxiliary contact being so arranged to retain contact with said other part of the switch blade on closing until said one part of the switch blade engages the relatively stationary main contact.

9. A disconnecting switch including a two-part movable switch blade, means pivotally mounting one part adjacent one end thereof, means pivotally mounting the other part adjacent the free swinging end of said one part so that the outer free end of said other part extends considerably beyond said one part, means biasing the two parts of the switch blade to an extended position, means causing said other part to rotate only in one direction relative to said one part when the switch blade is in its extended position, and a pair of parallel insulating plates between which the movable switch blade moves.

10. A disconnecting switch including a rotatable two-part movable switch blade, means pivotally mounting one part of said two-part rotatable switch blade at one end thereof about a substantially stationary pivot axis with the other extremity of said one part swinging freely, the other part of said switch blade being pivotally mounted adjacent the free extremity of said one part, a relatively stationary main contact for cooperation with said one part, a relatively stationary secondary latching contact for cooperation with said other part, means biasing the two-part movable switch blade to an extended position, and a pair of parallel insulating plates between which the movable switch blade moves.

11. A disconnecting switch including a rotatable two-part movable switch blade, means pivotally mounting one part of said two-part rotatable switch blade at one end thereof about a substantially stationary pivot axis with the other extremity of said one part swinging freely, the other part of said switch blade being pivotally mounted adjacent the free extremity of said one part, a relatively stationary main contact for cooperation with said one part, a relatively stationary secondary latching contact for cooperation with said other part, means biasing the two-part movable switch blade to an extended position, an auxiliary contact disposed adjacent the path of movement of said other part, impedance means connected between said auxiliary contact and the relatively stationary main contact, and a pair of parallel insulating plates between which the movable switch blade moves.

12. A disconnecting switch including a rotatable two-part movable switch blade, one part being pivotally mounted adjacent the free extremity of the other part, a relatively stationary main contact for cooperation with said other part, a relatively stationary secondary latching contact for cooperation with said one part, means biasing the two-part movable switch blade to an extended position, an auxiliary latching contact disposed adjacent the path of movement of said one part, impedance means connected between said auxiliary contact and the relatively stationary main contact, and a pair of parallel insulating plates between which the movable switch blade moves.

13. The combination in a load-break disconnecting switch of a rotatable two-part switch blade, one part being rotatable about a relatively fixed axis and the other part being pivotally mounted adjacent the extremity of said one part, means biasing the two parts to an extended position, a relatively stationary main contact engageable with the extremity of said one part, a relatively stationary secondary latching contact latching said other part of the switch blade during the opening operation to cause breaking of the two-part switch blade, an impedance, an auxiliary contact positioned adjacent the path of movement of said other part of the switch blade during its opening movement, said impedance means being connected between said auxiliary contact and the relatively stationary main contact, said auxiliary contact retaining contact with said other part of the switch blade on closing until said one part of the switch blade engages the relatively stationary main contact, and a pair of parallel insulating plates between which the movable switch blade moves.

References Cited in the file of this patent

UNITED STATES PATENTS

| | | |
|---|---|---|
| 775,665 | Scott | Nov. 22, 1904 |
| 953,021 | Case | Mar. 29, 1910 |
| 2,306,240 | Wyman | Dec. 22, 1942 |
| 2,351,426 | Healis | June 13, 1944 |
| 2,571,864 | Graybill | Oct. 16, 1951 |
| 2,586,290 | Baker et al. | Feb. 19, 1952 |

FOREIGN PATENTS

| | | |
|---|---|---|
| 134,946 | Great Britain | Nov. 17, 1919 |
| 315,597 | Italy | Mar. 2, 1934 |